United States Patent [19]
Saito et al.

[11] Patent Number: 4,768,043
[45] Date of Patent: Aug. 30, 1988

[54] OPTICAL SYSTEM FOR CHANGING LASER BEAM SPOT SIZE DURING SCANNING OF SCANNING LINE

[75] Inventors: Susumu Saito, Hachioji; Akira Arimoto, Musashimurayama, both of Japan

[73] Assignees: Hitachi, Ltd.; Hitachi Koki Co., Ltd., both of Tokyo, Japan

[21] Appl. No.: 52,883

[22] Filed: May 22, 1987

[30] Foreign Application Priority Data

May 23, 1986 [JP] Japan ................... 61-117390

[51] Int. Cl.⁴ .............. G01D 9/42; G01D 15/14; H04N 1/21
[52] U.S. Cl. .................. 346/108; 358/298; 358/300; 346/160
[58] Field of Search ............ 346/108, 107 R, 76 L, 346/160; 358/296, 298, 300, 302

[56] References Cited

U.S. PATENT DOCUMENTS

| | | | |
|---|---|---|---|
| 4,425,023 | 1/1984 | Matsumoto | 346/108 |
| 4,539,478 | 9/1985 | Sano | 346/108 |
| 4,642,701 | 2/1987 | Maeda | 346/108 |
| 4,651,169 | 3/1987 | Muka | 346/108 |
| 4,673,953 | 6/1987 | Hecht | 346/108 |

Primary Examiner—E. A. Goldberg
Assistant Examiner—Mark Reinhart
Attorney, Agent, or Firm—Antonelli, Terry & Wands

[57] ABSTRACT

A recording optical system comprises: a laser light source; means for modulating an intensity of a laser beam emitted from the light source; means for shaping a cross sectional shape of the laser beam; means for controlling the modulating means and the shaping means; and deflecting and focusing means for focusing and scanning the shaped laser beam onto the scanning surface. The laser beam size in the direction (sub scanning direction) perpendicular to the scanning direction is varied on the scanning surface by the shaping means, during the recording operation.

10 Claims, 3 Drawing Sheets

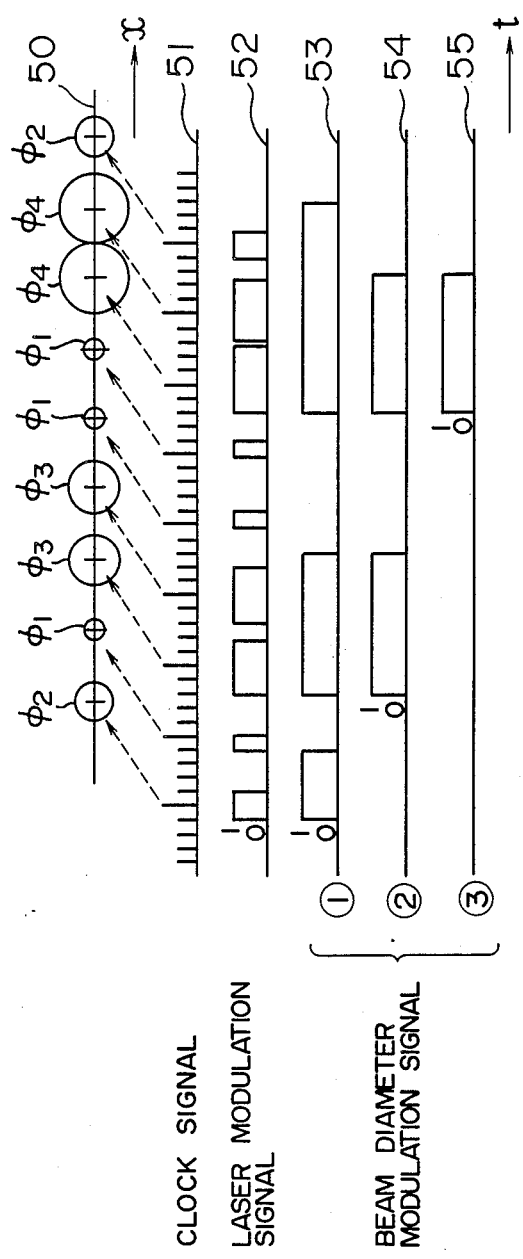

OPTICAL SYSTEM FOR CHANGING LASER BEAM SPOT SIZE DURING SCANNING OF SCANNING LINE

BACKGROUND OF THE INVENTION

The present invention relates to a recording optical system by laser beam scanning and, more particularly, to an optical system which can change a size of a recording laser beam spot during the recording operation. The invention is suitable to record half tones in a laser beam printer.

In the case of forming and recording an image by the laser beam scan, a picture plane is made up by a set of a number of pixels.

In general, a photo sensitive material or a photo conductive material is coated on a recording surface and a dimension of a pixel formed on the surface is determined by an exposure area of a laser light per a clock time upon scanning. The exposure area is nearly determined by both a spot size and a scanning velocity of the laser beam.

It has been known that, in case of a conventional laser beam printer, the beam spot size and the scanning beam velocity on the recording surface are kept constant during the scanning and recording operations. Therefore, the pixel dimension is held to a constant value as disclosed in, e.g., IBM J. Res. Dev. Vol. 21 (1977), pages 479–483. When the spot diameter on the scanning surface has to be changed, there has been proposed such a method whereby the position of the laser light source or the position of the lens on an optical path is changed (JP-A-58-65410, JP-A-58-121145) or such a method whereby a diameter of an incident beam to a focusing lens is adjusted by a diaphragm (JP-A-60-220309), or the like. All of these methods intend to keep constant the beam spot diameter on the scanning surface during the recording operation.

In the above conventional techniques, no consideration is paid to the point that the spot size during the scanning is changed. Therefore, it is difficult to reproduce a fine expression of a half tone, to change the thickness of a character on one scanning line, and to change the density of print dots, on one scanning line.

SUMMARY OF THE INVENTION

It is an object of this invention to provide a laser beam recording optical system which can arbitrarily change from one pixel size to another pixel size predetermined during the scanning.

With this recording optical system according to the invention, it is possible to make the expression of half tones fine and to make a character thick or thin. Further, the pixel density (print dot density) on one scanning line can be arbitrarily changed. Therefore, the number of kinds of pattern modes to be expressed on one picture plane can be increased and the picture quality of the pattern can be easily improved. Moreover, there is also such an advantage that it is possible to easily perform the correction to make the laser spot diameter or the like uniform. As a laser scan recording apparatus, the advanced function and high picture quality which cannot be provided in the conventional apparatus can be realized, by the invention.

The above object is accomplished by a combination of the modulation of the beam size in the direction perpendicular to the direction of the laser beam scanning and the modulation of the light intensity pulse width. The modulation of the scanning beam size can be attained by variations of a size of an incident beam into a focusing lens which focuses the beam to a spot on the scanning surface.

In this case, a beam spot diameter $d_x$ in the scanning direction (this direction is set to the x direction) of the laser beam on the scanning surface is held to a constant value which is sufficiently shorter than the interval between pixels. Only a beam spot diameter $d_y$ in the direction (this direction is set to the y direction) perpendicular to the scanning direction is variable. Further, when the on-off modulation of the laser beam is performed, the on-time (or off-time) width is changed synchronously with the modulation of the beam spot diameter $d_y$, thereby controlling an exposure width $P_x$ in the x direction. Namely, the dimension of a pixel is determined by both the beam spot diameter $d_y$ in the y direction and the exposure width $P_x$ in the x direction.

In this manner, the exposure area at a predetermined pixel position on the scanning line can be modulated at a high speed, so that each pixel dimension can be changed.

Assuming that a focal distance of the focusing lens is f and a wavelength of laser beam is $\lambda$, there exists the following relation between a beam spot diameter d on the scanning surface and an incident beam diameter D to the focusing lens.

$$d = k \lambda f / D$$

k is a constant depending on the intensity distribution at the cross section of the laser beam. Therefore, by changing an incident beam diameter $D_y$ corresponding to the spot diameter $d_y$ in the y direction, $d_y$ can be modulated by the relation of $$d_y = k \lambda f / D_y$$

On the other hand, if the beam spot diameter $d_x$ in the scanning direction is set to be sufficiently smaller than the interval between pixels, the exposure width $P_x$ in the scanning direction is given by $P_x \simeq v\eta$, where a scanning velocity on the scanning surface is v and an exposure time is $\eta$. Therefore, $P_x$ can be changed by modulating the exposure pulse width.

Thus, by synchronously changing $D_y$ and $\eta$, the area $(P_x \times d_y)$ of each pixel on the scanning line can be modulated.

BRIEF DESCRIPTION OF THE DRAWINGS

FIG. 6 shows a signal time chart of the signal system.

DESCRIPTION OF THE PREFERRED EMBODIMENTS

Figure 1:
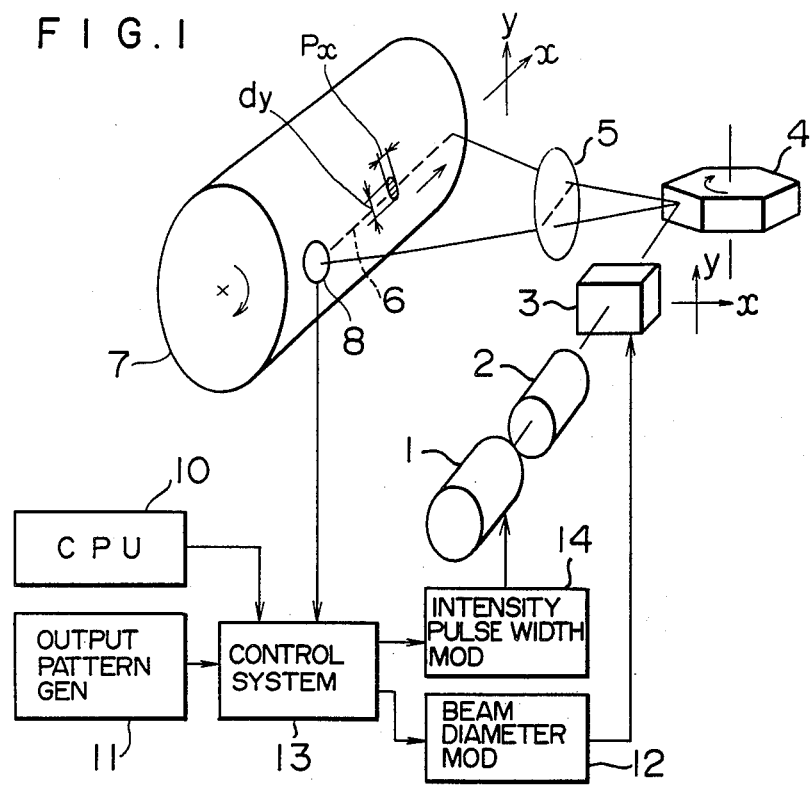
FIG. 1 is a schematic diagram showing a recording optical system according to an embodiment of the present invention.

An embodiment of the present invention is described hereinbelow. FIG. 1 shows a constitution of an optical system when the invention is applied to the case where patterns or data are recorded onto an electrophotographic material or a photo sensitive film by a laser beam scan, or the like.

A light source 1 is a laser oscillator which can modulate by itself such as a semiconductor laser or a laser oscillator having an external modulator such as an acousto-optical light modulator. A laser beam emitted from the light source 1 is subjected to the on-off modulation of the light intensity on the basis of a signal from an output pattern generator 11 and is also subjected to the modulation of the exposure pulse width ($\eta$) in correspondence to the pixel diameter ($P_x$) in the scanning direction (x direction). The laser beam emitted from the light source 1 enters a beam shaping optical system 2. The laser beam is converted into a beam diameter $D_0$ (corresponding to the maximum beam diameter) corresponding to the spot diameter at the maximum resolution on a scanning surface 6 and thereafter, it enters a beam diameter changing device 3. The beam diameter changing device 3 can change only the diameter ($D_y$) in the y direction of the incident laser beam without changing the diameter in the x direction ($D_x = D_0$). Therefore, the device 3 is made operative by a beam diameter modulator 12 on the basis of the output pattern data and the diameter D in the y direction is changed. Thereafter, the laser beam deflects by a light deflecting device such as, e.g., a rotating polygon mirror 4 and through a scanning and focusing lens such as, e.g., an F $\theta$ lens 5. The spot diameter $d_y$ in the y direction of the laser beam is changed on the scanning surface 6 in correspondence to the output pattern. The output pattern data contain, for example, the data to reproduce a half tone, the data to thickly print, the data to make a character thick, and the like. The laser beam is further scanned in the x direction at a constant speed. On the other hand, a photodetector 8, which detects the optical beam position, is arranged near the scanning start position. The detection signal from the photodetector 8 is used as a synchronous reference signal to each scanning line and a laser spot is formed and exposed at the predetermined position of a pixel on the scanning line. The scanning surface 6 is moved in the y direction at a constant speed. A desired output pattern or image can be formed and recorded by a set of laser spots on each scanning line.

Figure 2A:
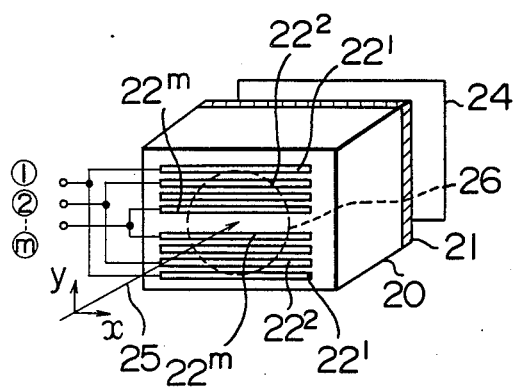
FIGS. 2A and 2B are a schematic diagram of a beam diameter changing device which is used in the recording optical system of the embodiment and a schematic cross sectional diagram of the beam diameter changing device.
Figure 2B:
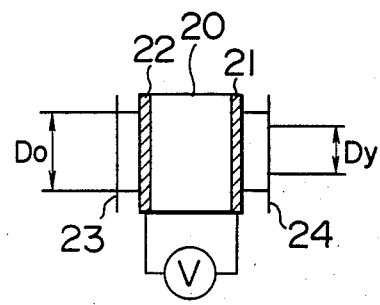

The beam diameter changing device 3 is explained. FIG. 2A is a diagram showing an example of a constitution of the device 3 and illustrates the case where the electrooptical effect is used. FIG. 2B shows a schematic cross sectional view of the device of FIG. 2A. A common transparent electrode 21 is attached to one surface of an electrooptical crystal 20 such as $LiNbO_3$, $KH_2PO_4$, $LiTaO_3$, $Sr_xBa_{1-x}Nb_2O_6$, or the like. A number of insulated transparent electrodes $22^1$, $22^2$, ..., $22^m$ are adjacently arranged on the other surface of the crystal 20. Two electrodes $22^1$, two electrodes $22^2$, ..., and two electrodes $22^m$ constitute each pair and are symmetrically arranged with respect to the optical axis. Each of those pairs is electrically connected and the respective signal applying terminals are numbered at ①, ②, ..., ⓜ in accordance with the order from the outside. A linearly polarized laser beam is used as a laser beam 25. If a laser beam 25 is not polarized, a polarizing plate 23 is arranged in front of the optical crystal 20. After the laser beam passes through the plate 23, it is converted to a linearly polarized beam, and is led to the electrode surface. On the other hand, a polarizing plate 24 for analysis is arranged on the out-going side of the crystal 20, in such a direction to transmit the laser beam when no voltage is applied to the crystal 20. Namely, the directions of polarizing plates 23 and 24 are set in the parallel state. In the foregoing constitution, when a DC voltage, which is determined by the optical crystal dimension, is selectively applied to each electrode in parallel with the optical path, the polarization components of only the voltage applied portions of the incident laser beam are rotated due to the electrooptical effect and are cut off by the polarizing plate 24. Therefore, for example, when the voltage is applied to the pair of electrodes $22^1$ and to the pair of electrodes $22^2$, only the cross-sectional portion of incident circular beam 26 that exists on the central side than the pairs of electrodes $22^1$ and $22^2$ can be transmitted through the polarizing plate 24. Thus, the beam diameter $D_y$ in the y direction of the incident beam on the focusing lens 5 is in FIG. 1, accordingly, the beam spot diameter $d_y$ in the y direction on the scanning surface can be changed. The beam diameter in the x direction, on the other hand, is unchanged even when the voltage is applied to said electrodes. In order to completely cut off the laser beam, it is desirable that the voltage to be applied is set to such a value as to rotate the incident beam by $\pi/2$ with respect to the polarizing direction of the incident beam.

Figure 3:
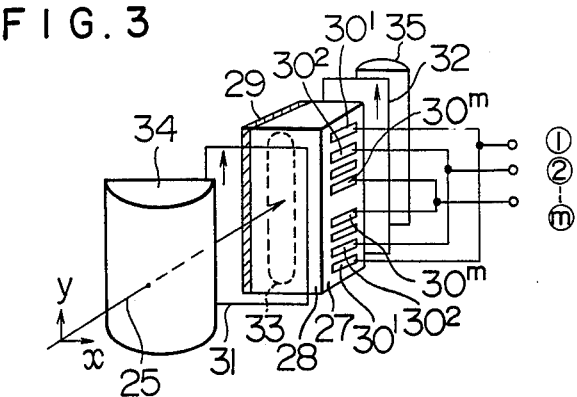
FIG. 3 is a schematic diagram showing another beam diameter changing device which is used in the recording optical system of the embodiment.

FIG. 3 shows an example of another beam diameter changing device 3. In this example, although the electrooptical effect is used on the basis of the principle similar to the example shown in FIGS. 2A and 2B, it differs from the constitution of FIGS. 2A and 2B with regard to the point that the electric field is applied in the direction perpendicular to the optical path. A common electrode 29 is disposed on one surface of an optical crystal 27 which is perpendicular to an irradiating surface 28 of the laser beam 25. m pairs of electrodes $30^1$, $30^2$, ..., and $30^m$ are adjacently arranged on the surface of the crystal 27 on the side opposite to the surface with the common electrode 29. Those pairs of electrodes $30^1$ to $30^m$ are symmetrically arranged with respect to the optical axis in the y direction around the portion near the central portion of the crystal 27 as a center. Polarizing plates 31 and 32, whose polarizing directions are coincident, are arranged near both the incident and out-going sides of the crystal 27, respectively. Further, the incident laser beam 25 passes through a cylindrical lens 34 and is focused in only the x direction shown in the diagram and is led as a flat-shaped laser beam 33 onto the irradiating surface 28 of the crystal 27. After the beam 25 leaves the crystal and passes through the polarizing plate 32, the beam is transmitted through a cylindrical lens 35 and the beam diameter in the x direction is changed to a value before it is led to the crystal or to another desired value.

With this constitution, there is such an advantage that the thickness of the crystal can be reduced and the applied voltage can be set to a value lower than that in the example of FIGS. 2A and 2B.

When the voltage is applied to the beam diameter changing device 3, similarly to the case of FIGS. 2A and 2B, the laser beam in only the voltage applied portion is locally cut off. Therefore, by selectively applying the voltage to the proper electrodes, the beam diameter $D^y$ in the y direction of the laser beam can be changed after it leaves the crystal and passes through the polarizing plate. If the laser beam has already been linearly polarized, there is no need to use the polarizing plate 31. The beam diameter in the x direction is not changed even when the voltage is applied.

Figure 4:
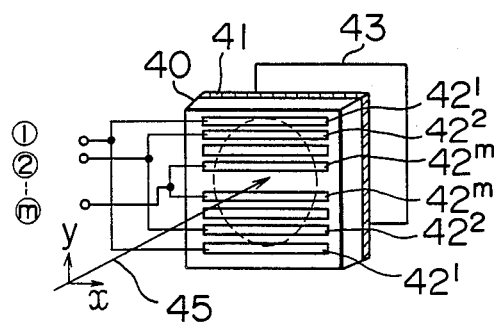
FIG. 4 is a schematic diagram showing still another beam diameter changing device which is used in the recording optical system of the embodiment.

FIG. 4 shows an embodiment of still another beam diameter changing device 3. This device uses an optically active medium 40 such as liquid crystal cell or PLZT $\{(Pb_xLa_{1-x})(Zr_yTi_{1-y})\}O_3$ or material consisting of these components and other very small amounts of elements}whose polarizing plane for the incident light is varied by the electric field. A common transparent electrode 41 is disposed on one surface of the medium 40. m pairs of insulated transparent electrodes $42_1$ to $42^m$ are arranged on the other surface of the medium 40 opposite to the surface with the common electrode 41. In this case, similarly to the above, two electrodes $42^1$ form one pair, two electrodes $42^2$ form one pair, ... and these pairs of electrodes $42^1$ to $42^m$ are symmetrically arranged in the y direction around the portion near the optical axis as a center. A laser beam 45 which is linearly polarized in a constant direction is led to the medium 40. A polarizing plate 43 is arranged near the out-going side of the medium 40 in order to stop the different polarizing direction portion of the beam from that of incident laser beam. With the above device constitution, when a voltage is applied to the electrode portion, the polarization plane of the laser beam in only the voltage applied portion in the medium is locally rotated and the laser beam in this portion is cut off by the polarizing plate 43. Therefore, by selectively applying the voltage to the electrodes, the out-going beam diameter $D_y$ in the y direction can be changed. At this time, the beam diameter $D_x$ in the x direction is not changed. Thus, the beam spot diameter $d_y$ in the y direction on the scanning surface can be changed by applying the voltage to the device 3.

A signal circuit system and a signal time chart in the case of recording while changing the beam spot diameter on the scanning surface will now be described.

Figure 5:
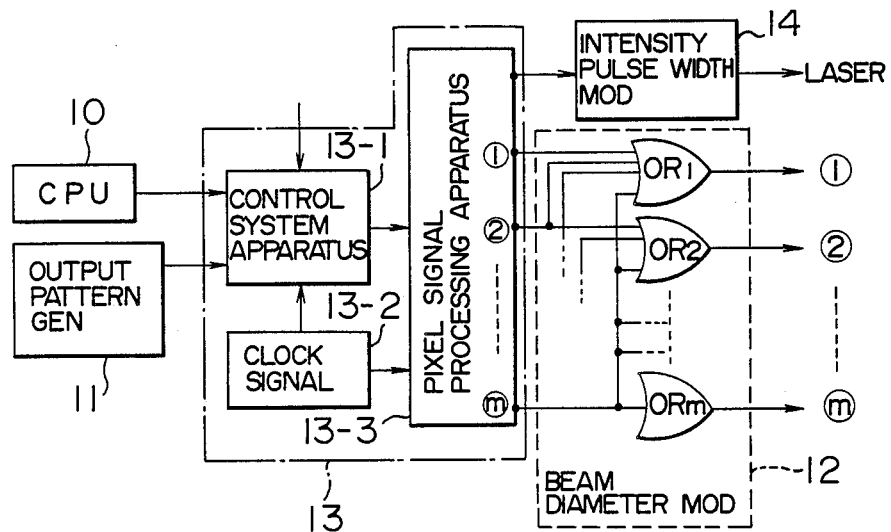
FIG. 5 is a block diagram of a signal system which is used in the recording optical system of the embodiment.

FIG. 5 is a block diagram showing only the signal circuit system taken out of the embodiment of FIG. 1. Print pattern data is generated as a pixel signal from the output pattern generator 11 on the basis of the data from a computer (CPU) 10. The print pattern data is temporarily stored in a control system apparatus 13-1 every scanning line. This pattern data is transferred to a pixel signal processing apparatus 13-3 in synchronism with a clock signal from a clock signal generator 13-2 using a signal from the laser beam position detector 8 as a trigger signal. The pixel signal is separated into a signal for the laser on-off modulation and for pulse width modulation and a signal for beam diameter modulation. These signals are applied to an intensity pulse width modulator 14 and to the beam diameter modulator 12, respectively. Assuming that the pixel diameter is modulated into (m+1) levels, the beam diameter changing device 3 has m pairs of electrodes. The signal is applied to each electrode in accordance with the pixel dimension (pixel diameter) data included in the print pattern data. The pixel diameter corresponds to the beam spot diameter $d_y$ in the y direction.

In the state in which a signal is applied to none of the electrodes, the beam diameter $D_y$ in the y direction is the maximum. Therefore, the beam spot diameter $d_y$ in the y direction on the scanning surface becomes minimum. While the voltage is sequentially applied to the electrodes from the outermost side to the central portion in accordance with the order of ① to ⑩, the beam diameter $D_y$ in the y direction decreases and the beam spot diameter $d_y$ increases. When the signal was applied to all of the electrodes, the diameter $d_y$ becomes the maximum. Since the pixel diameter (an exposure width) in the x direction is determined by the beam scanning velocity and the laser irradiating time η, the pulse width modulation of (m+1) levels is executed in accordance with the modulation level of the pixel diameter. In this case, the signal to be applied to the beam diameter changing device 3 and the laser pulse width signal are set to the proper values in correspondence to the pixel diameter on the basis of the laser beam scanning velocity v. When the complete white background (black background in the case of the negative image) is reproduced, the laser beam is set into the off state.

FIG. 6 shows an example of a time chart in the case of recording by changing the pixel diameter on one scanning line. This example relates to the case where the pixel diameter is changed into four levels of $\phi_1$ to $\phi_3$. Numeral 50 denotes one scanning line and the pixels of different diameters are recorded at each pixel position as a center. The interval between pixels is determined by the laser beam scanning velocity and the clock signal interval. Numeral 52 denotes a laser modulation signal supplied from the intensity pulse width modulator 14. The pulse width modulation is performed to change the exposure width $P_x$ in the x direction. Numerals 53, 54, and 55, which are output signals from the beam diameter modulator 12, represent beam diameter modulation signals which are supplied to the beam diameter changing device 3. The signal 53 is shown in the time chart as a signal which is supplied to the outermost side electrode terminal ①. The signals 54 and 55 are shown in the time charts as the signals which are sequentially supplied to the inner electrode terminals ② and ③. In the case of the minimum pixel diameter, the signal is not supplied to all of the electrodes. In the case of the maximum pixel diameter, the signal is applied to all of the electrodes.

The signals 52 and 53 to 55 are determined on the basis of the print pattern data and there is a constant relation between one pixel dimension and each signal. It is needless to say that the interval between clock signals 51 must be changed to change the print dot density.

In the foregoing embodiment, an example of the beam diameter changing device using the electrooptical effect has been shown as a beam diameter changing device for use in the present invention. However, the similar effect can be also obtained when other device using an acousto-optical effect, optical guide type photo switching system, or the like is used.

According to the present invention, image data can be recorded by changing the pixel dimension during the laser scanning recording operation. Therefore, a very fine image of a half tone can be recorded and image data can be recorded by changing the print dot density on one scanning line and the like. In this manner, the picture quality and the recording performance can be improved.

We claim:
1. A recording optical system comprising:
a laser light source;
means for modulating an intensity of a laser beam emitted from said light source;

means for shaping a cross sectional shape of the laser beam;

means for controlling said modulating means and said shaping means; and deflecting and focusing means for focusing and scanning the shaped laser beam onto a scanning surface along a scanning line, wherein said shaping means enables variation of a laser beam size in a direction (sub-scanning direction) perpendicular to a scanning direction on the scanning surface during scanning of the scanning line.

2. A recording optical system according to claim 1, wherein a laser exposure time is changed in accordance with the laser beam size in said sub scanning direction.

3. A recording optical system according to claim 1, wherein said control means changes an interval between clock signals in accordance with the laser beam size in said sub scanning direction.

4. A recording optical system comprising:

a laser light source;

modulating means for modulating an intensity of a laser beam emitted from said light source;

shaping means for shaping a cross sectional shape of the laser beam;

control means for controlling said modulating means and said shaping means; and deflecting and focusing means for focusing and scanning the shaped laser beam onto a scanning surface;

wherein said shaping means includes an electrooptical crystal and a plurality of electrodes provided thereon, said shaping means being responsive to a signal from said control means selectively applied to said plurality of electrodes for enabling variation of a laser beam size in a direction (sub scanning direction) perpendicular to a scanning direction on the scanning surface.

5. A recording optical system according to claim 4, wherein a laser exposure time is changed in accordance with the laser beam size in said sub scanning direction.

6. A recording optical system according to claim 4, wherein said control means changes an interval between clock signals in accordance with the laser beam size in said sub scanning direction.

7. A recording optical system according to claim 4, wherein said shaping means includes a common electrode provided on the opposite side of said electrooptical crystal from said plurality of electrodes, so that a direction of an incident laser beam upon said electrooptical crystal is parallel with that of an electric field between said common electrode and said plurality of electrodes.

8. A recording optical system according to claim 7, wherein said electrooptical crystal is an optically active medium which changes a polarizing plane of said incident laser beam when said electric field is applied to said optically active medium.

9. A recording optical system according to claim 4, wherein a common electrode is provided on the opposite side of said electrooptical crystal from said plurality of electrodes, so that a direction of an incident laser beam upon said electrooptical crystal is perpendicular to that of an electric field between said common electrode and said plurality of electrodes.

10. A recording optical system according to claim 4, wherein said control means enables separation of a pixel signal supplied to said control means into an output signal for modulating said intensity of said laser beam and output signals for shaping said cross sectional shape of said laser beam, in response to a laser beam detection signal supplied to said control means.

* * * * *